United States Patent [19]

Parks

[11] Patent Number: 4,949,675

[45] Date of Patent: Aug. 21, 1990

[54] AUTOMATIC ANIMAL FEEDER

[76] Inventor: Jack C. Parks, 4001 Visby La., Las Vegas, Nev. 89119

[21] Appl. No.: 284,064

[22] Filed: Dec. 13, 1988

[51] Int. Cl.$^5$ .............................................. A01K 5/02
[52] U.S. Cl. .............................. 119/51.11; 119/57.92; 99/537
[58] Field of Search ............... 119/51 R, 51.11, 52 R, 119/52 AF, 56 R; 99/537; 56/341

[56] References Cited

U.S. PATENT DOCUMENTS

| | | | |
|---|---|---|---|
| 164,400 | 6/1875 | Sieber | 99/537 X |
| 2,809,428 | 10/1957 | Puerner | 99/537 X |
| 3,464,374 | 9/1969 | Morris | 56/341 |
| 4,356,205 | 10/1982 | Richards | 99/537 X |
| 4,767,633 | 8/1988 | Fowler | 99/537 X |

FOREIGN PATENT DOCUMENTS 2494092  5/1982  France .................................. 99/537

Primary Examiner—Robert P. Swiatek
Assistant Examiner—R. Thomas Price
Attorney, Agent, or Firm—Quirk, Tratos & Roethel

[57] ABSTRACT

An automatic animal feeder for delivering preselected portions of a hay bale at desired time intervals includes a self-contained housing including a chamber for enclosing a bale of hay and a cutting blade mounted to traverse the bale to sever a portion thereof. The bale is movable toward the cutting blade by a pair of winches which operate for a preset time. The device is electrically powered and is sequenced by timers which control the bale delivery and cutting operations.

12 Claims, 4 Drawing Sheets

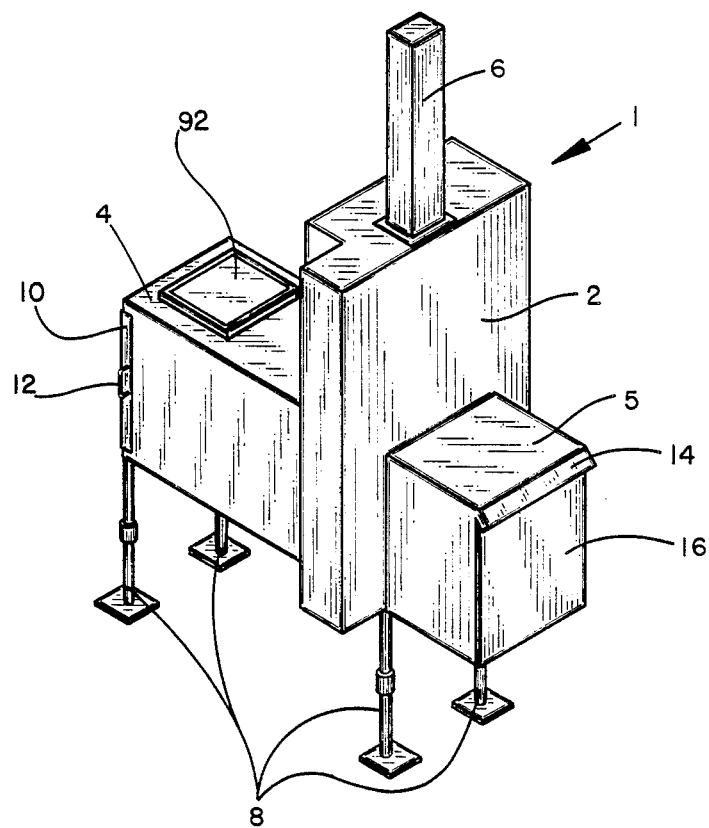
FIG. I

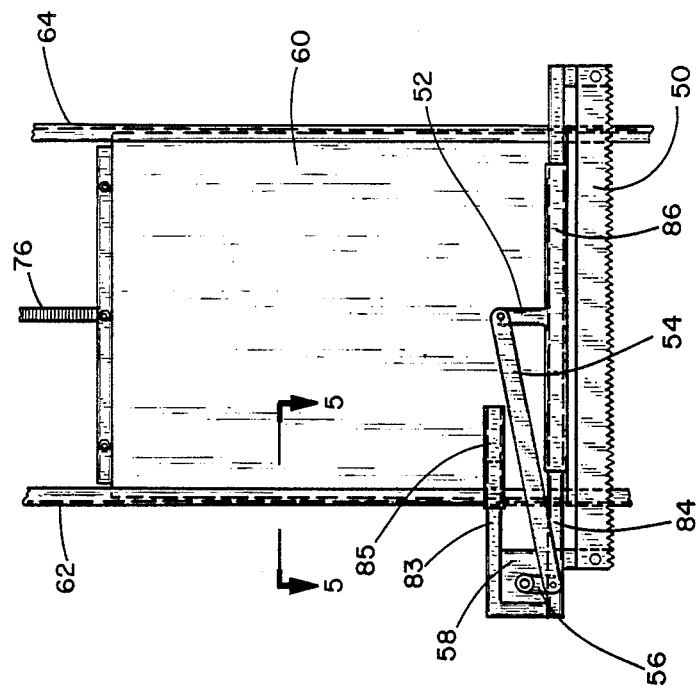
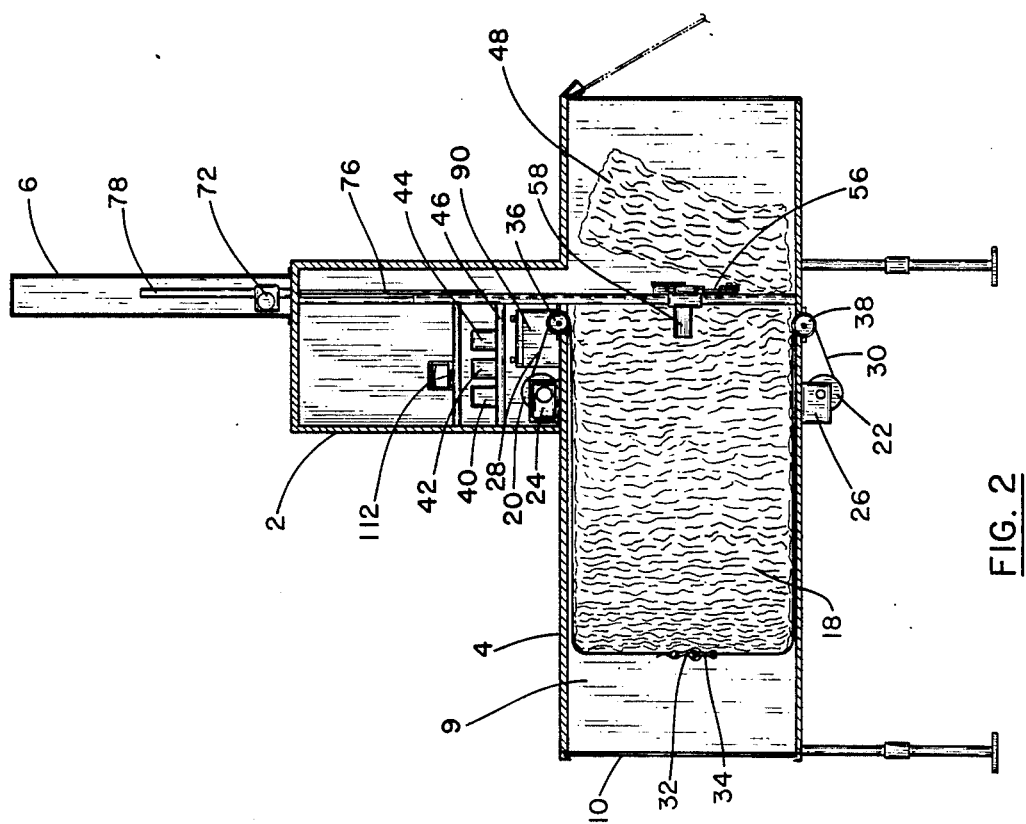

AUTOMATIC ANIMAL FEEDER

BACKGROUND OF THE INVENTION

This invention relates to an apparatus for automatically feeding portions of a hay bale to animals. More particularly, it relates to a self-contained unit which advances a hay bale toward the cutting blade and which automatically slices portions of the bale, making the feed available to animals at preselected timed intervals.

The feeding of large animals, such as horses and cows, is frequently inconvenient since it must take place in the field. In many cases, multiple trips must be made to ensure that the animals have adequate feed, yet are not overfed at any given time. In the past, it has often been necessary for a farmer to manually separate portions of feed from a bale of hay, resulting in an inconvenient and inefficient operation. The problem was particularly acute for persons who owned a small number of animals and who wished to leave town for a few days, leaving no way to provide a frequent supply of small portions of food for their animals.

In the past, there have been many ways known to automatically deliver hay or similar feed to animals. For example, Florek, U.S. Pat. No. 3,312,196 discloses a transport system for a plurality of hay bales to a trough for feeding. A hay box for feeding horses is shown in Snel, U.S. Pat. No. 4,294,197; however, this device does not have the ability to enclose the rack to prevent feeding at other than desired times. Elliott, U.S. Pat. No. 1,022,309 shows a feeder which has a door which opens automatically at a preset time. Dueringer, U.S. Pat. No. 2,704,995 discloses a silo having a centrally-pivoted radial chain saw which loosens silage, and a screw feeder which transports the silage to a trough. A feed box having an automatically deliverable payload actuated by weights is disclosed in Faulkner, U.S. Pat. No. 727,925. Askew, U.S. Pat. No. 600,056 discloses an automatic feeder in which a timer opens the feed bin doors. Baltz, U.S. Pat. No. 2,861,544 discloses an automatic silo feeder similar to the Dueringer patent.

The present invention is designed to feed a relatively small number (e.g., 1-3) of animals portions of a hay bale on a timed basis. Basically, the device consists of a horizontal chute enclosed within a styrofoam-insulated housing, the chute being defined by a housing which encloses a bale of hay. The chute or chamber has a door which moves up and down vertically on an electrically-operated rack and pinion mechanism. The entire forward portion of the feeder is enclosed by an additional door which is hinged, preventing the animals from becoming entangled in the operating mechanism of the feeder and the cutting device. The hay bale is moved through the chute by a pair of cables which extend around opposing sides of the bale and are removably fastened at the rear of the bale. Each cable is operated simultaneously by a separate winch which is actuated by a timer. The timer is preset to go on at a certain time, and operates for a sufficient length of time to move the bale forwardly in the chute for a preset desired distance. A horizontally-mounted hacksaw is then automatically actuated, cutting downwardly transversely through the bale and releasing a flake or slice of the bale which falls downwardly into the livestock feeding tray. The device is electrically powered, and can be actuated by a solar-powered 12 volt battery enabling remote operation in a field.

Accordingly, it is an object of the invention to provide portions of a bale of hay for livestock feeding at predetermined times. It is another object of the invention to provide an apparatus for feeding portions of a hay bale to livestock in remote field locations. It is yet another object of the invention to provide an automatic animal feeder which slices off flakes of a preselected size from a hay bale at predetermined time intervals. These and other objects are accomplished by the device of the invention, a more detailed description of an embodiment of which follows herein.

BRIEF DESCRIPTION OF THE INVENTION

An automatic animal feeder includes an enclosed housing having a horizontal chamber located within the housing adapted to receive a hay bale. While any size and shape of hay bales may be used, conventional bales are elongate blocks of compressed hay having a square or rectangular cross section. Electrically powered advancement means moves the hay bale through the chamber at a preselected time, presettable by means of a timer, towards a cutting blade which is mounted at an end portion of the chamber. The cutting blade is automatically activated after the hay bale has advanced and moves transversely through the bale, severing a portion or flake from the bale which then falls into a feeding location. The apparatus is powered by a 12 volt power supply, which can be a solar-powered battery.

BRIEF DESCRIPTION OF THE DRAWINGS

The invention is best understood with reference to the drawings, in which:

FIG. 1 is a perspective view of the exterior of the automatic feeder of the invention;

FIG. 2 is a side section view thereof;

FIG. 3 is a front section view of the feeder showing the cutting mechanism;

DETAILED DESCRIPTION OF A PREFERRED EMBODIMENT

Figure 4:
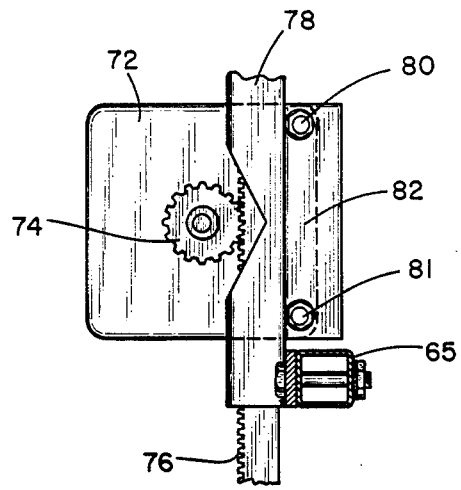
FIG. 4 is a partial view showing the door opening mechanism.

Referring first to FIG. 1, automatic hay feeder 1 has a housing comprising a central cutting blade housing portion 2, a feed chute portion 5 at a forward location, and a rearward housing portion 4 which encloses the hay bale chamber. A vertical housing portion 6 encloses the rack guide upon which the door and cutting blade travel. The housing is supported by four adjustable legs 8 which elevate the feeder above the ground. A rear sliding door 10 having a handle 12 is removable to open the chamber to enable a bale of hay to be inserted.

A forward portion 5 of the housing encloses a forward portion of the chamber or chute and has a door 16 loosely mounted on hinges at its uppermost portion which is pushed open when the flake is cut from the bale and falls downwardly (see the phantom position in FIG. 2). A flange 14 extends downwardly from the upper end of the housing, restricting the degree of opening of the door 16 and protecting an animal from injury during operation of the device.

Operation of the unit is best seen in FIG. 2. A bale of hay 18 is placed in the chamber or chute 9 through rear door 10. The bale is advanced through the chamber by advancement means comprising upper and lower winches 20 and 22 which are mounted on winch mounts 24 and 26, respectively. An upper cable 28 extends forwardly over pulley 36, and then rearwardly around the top and rear sides of bale 18. Lower winch cable 30 extends from the winch forwardly over pulley 38, and thence rearwardly over the lower and rear sides of the bale. The ends of the upper and lower cables are releaseably connected by a pair of interengaging fasteners or hooks 32 and 34. In operation, the upper and lower winches are actuated simultaneously, retrieving cable and consequently drawing the bale forwardly in the chamber.

The unit is operated by three electrically-actuated timers 40, 42, and 44 which are mounted on the interior of the housing. Timer 40 is a clock which automatically turns the unit on at a preset time. Timer 42 is a door timer which automatically raises and lowers the vertical door 60 and the cutting apparatus. Timer 44 actuates the hay bale advancement mechanism for a predetermined time, thus setting the size of the flake to be delivered. The timers are mounted on a shelf 46 attached to the interior of the housing wall. A voltmeter 112 is also mounted to the interior of the housing wall and measures the voltage across the power source for the purpose of making sure that the proper voltage is maintained in the battery. If the voltage drops below 12 volts during operation, insufficient power will be available to sever the flake from the bale. This is important especially if the unit is operated with the battery as the sole power source. A solar charger 92 may be used to charge the battery. Alternate power sources are of course contemplated, e.g., a transformer such as Archer No. 273-15158 for converting 120 v AC power to 18 v AC may be used.

A flake or slice of hay 48 is severed from the bale 18 by a cutting means which consists of a hacksaw blade 50 (see FIG. 3) mounted to travel downwardly through the hay bale while reciprocating in a vertical plane. The cutting blade is driven by an electrical motor 58 which is mounted on a bottom portion of a door 60 which slides up and down in a vertical plane to close the forward portion of chamber 9. The drive mechanism for the motor is best seen in FIG. 3. A pair of sleeves or guides 85 and 86 are welded to the forward portion of the door and are adapted to slideably receive mounting arms 83 and 84 on which the motor 58 is mounted. A vertical lug 52 is welded to the guide 86. The reciprocating motion is imparted to the blade through a cam 56 rotatably attached to the motor and an elongate actuating arm 54 which is pivotally attached at its ends to the cam 56 and the fixed lug 52. Accordingly, when the motor 58 rotates, arms 83 and 84 slide back and forth in the sleeves 85 and 86. The saw blade 50 is mounted on the lower arm 84 as shown.

Figure 5:
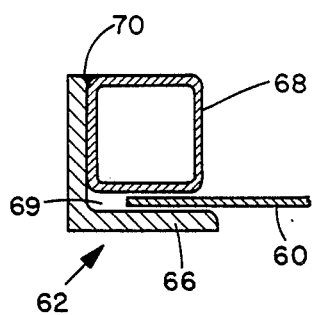
FIG. 5 is a partial horizontal section view of the door guide.

Accordingly, the entire motor and blade assembly is mounted on a bottom portion of the door 60. The door is mounted on frame members 62 and 64 which extend vertically upwardly from the housing. Mounting of the door is best seen in FIG. 5. The frame member 62 consists of angle iron 66 to which a square tubing length 68 is welded at 70. The door 60 travels upwardly and downwardly through slot 69 which is formed between the tubing wall and the angle iron flange.

The mechanism for lifting and lowering the door is best seen in FIGS. 2, 3 and 4. A drive motor 72 is mounted by fastening bolts 80 and 81 onto a mounting flange 82 welded to rack guide 78. The rack guide is a vertically mounted tubing length mounted on a cross brace 65 which extends between frame members 62 and 64. The rack 76 is welded to the door at a central portion thereof as shown in FIG. 3, and is driven by gear 74 of the motor. The motor 72 sequentially raises the door, opening the front of the chamber, awaits advancement of the hay bale, and then lowers the door, thereby engaging the saw blade 50 with the hay bale. As the door is continually driven downwardly by the motor, and the blade reciprocates, the saw traverses the hay bale as shown in FIG. 2.

Figure 6:
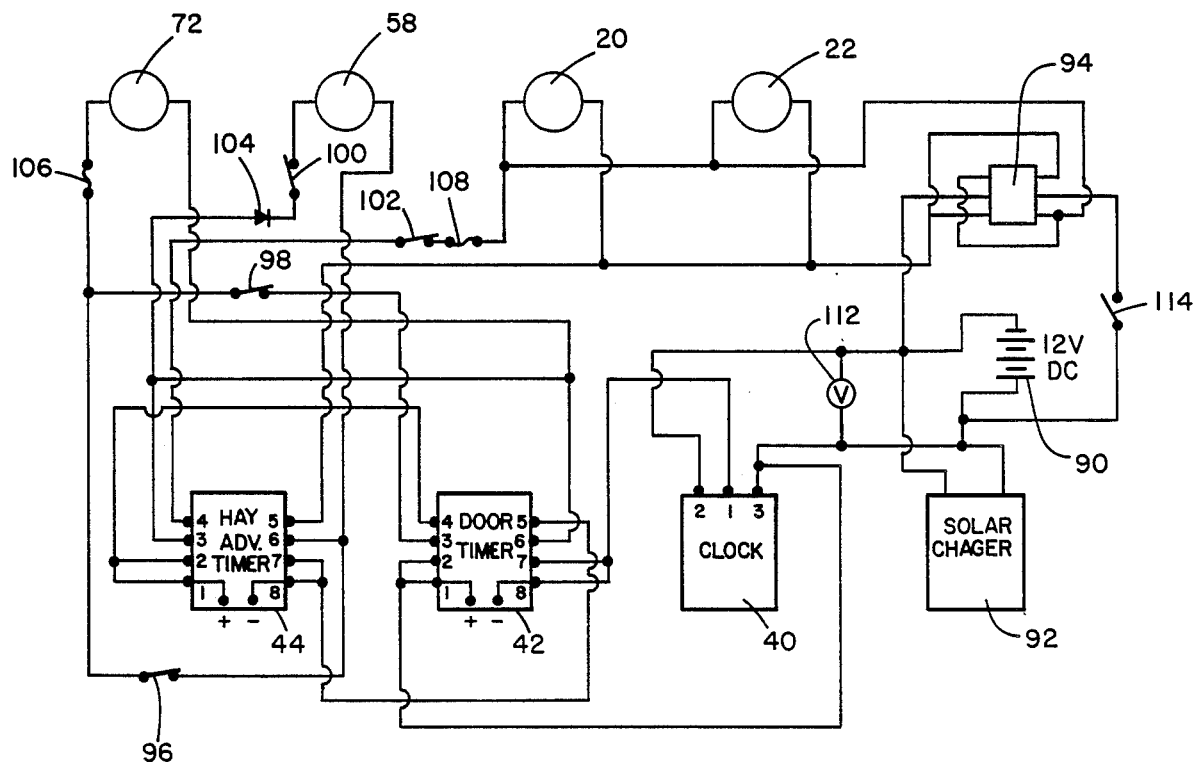
FIG. 6 is an electrical diagram for the device.

The electrical components of the system and their connection are best seen in FIG. 6. The apparatus is powered by conventional 12 volt battery 90 (or any other 12 volt source, which may optionally be connected to a 5 watt solar charger 92. The winch drive motors 20 and 22 are conventional reversible 12 volt motors having an operating speed of 12 rpm. The blade drive motor is also a 12 volt motor having a speed of 12 rpm. The motor 72 for raising and lowering the door is a reversible 12 volt motor having an operating speed of 1.5 rpm. Reverse switch 94 is a DPDT switch, 12 volt, 20 amps, heavy duty spring return, manufactured by Archer as Part No. 275-709, and is thrown to permit the winches to operate in reverse to reset cables 28 and 30 in order to insert a new bale of hay. This switch is only used during the time when a new bale of hay is placed into the chamber.

The clock 40 and timers 42 and 44 are all conventional items available from SSAC, Inc., of Liverpool, N.Y. The timers have built-in time delay mechanisms which allow sequential operation of door opening, hay bale advancement, and cutting. The minute/hour timer, which is used to actuate and deactuate the entire mechanism, is Order No. RS1B24; 12 volt DC, off time first, with adjustable on and off times. Timer 42, the door timer which raises and lowers the door 60, is series ERDI 128 which is a 12 volt DC timer, with an adjustable time delay of 0.1–10 minutes. The timer has an internal time delay relay. Upon application of power to the input terminals, the output contact transfer and the time delay is initiated. Upon completion of the delay period the output reverts to its original unenergized condition. Reset is accomplished by removal of input power. The hay advance timer 44 is also a "delay on make" timer Series No. ERDM 127. This unit is also a 12-volt timer having an adjustable time delay from 0.1–5 minutes. Time delay is initiated when power is applied to the input terminals. At the end of the delay period, the output contacts transfer. Removal of input power accomplishes reset.

There are also a number of safety devices that ensure trouble-free operation of the unit. Fuses 108 and 106 are one-amp slow-burning fuses designed to protect the motors from burning out. Diode 104 (Part No. SK9003) precludes the cutting blade motor from operating while the door is going up. Five contact microswitches 96, 98, 100, 102, and 114 (see FIGS. 6 and 7) are also included to shut off various operations (such as door opening or closing) when the operation is finished even though the timer may still be running. Switches 96, 100, 102, and 114 are McGill snap-action DPDT 20 amp switches. These switches are mounted in the housing near the extremities of the door travel and are contacted by a flange (not shown) on the door when the door is in the fully open position or the fully closed position. Microswitch 114 is a back safety switch, normally open, which cuts off power to the reverse switch 94 when the door is in any position other than fully closed. In other words, the winches can only be reversed if the door is closed. This switch is located at the lower end of the door travel.

Microswitches 96, 100, and 102 are also normally closed DPDT switches located at the bottom portion of the door travel. Microswitch 96 is a door down stop switch, which is contacted by the door flange when the door goes to the fully closed position and shuts off power to the door motor 72. This precludes the door motor from continuing to operate after the door reaches its fully closed condition. Microswitch 98 is also located at the closed position of the door and shuts off power to the cutting blade motor so that the timer can complete its course after the door is fully closed. Microswitch 102 is a safety switch for the winch motors and is also located at the lower end of the door travel. This switch precludes power from the winch motors when the door is closed, so there is no reverse polarity to the hay bale advance timer. Microswitch 98 is a single pole, double throw switch mounted at the uppermost travel end of the door, being contacted by the flange when the door is fully open. This switch is normally closed and opens when the door reaches its uppermost position, thus shutting off the door motor.

Figure 7:
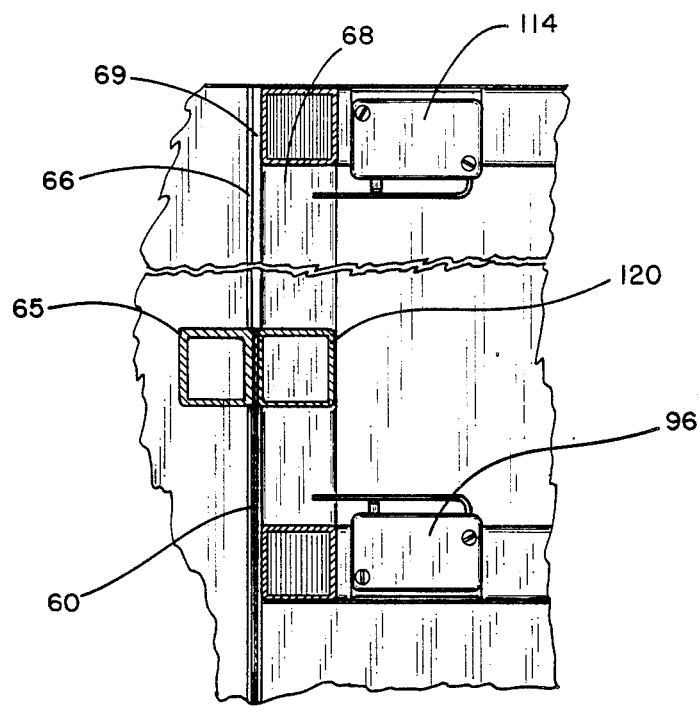
FIG. 7 is a partial section view showing safety microswitches at the fully open and fully closed position of the door.

A drawing of the safety microswitches is shown in FIG. 7. A length of square tubing 120 is welded to the rear of the door 60 at an upper portion thereof and contacts the various microswitches at the fully open and fully closed positions of the door.

When the clock 40 turns on at a preset time, it provides voltage between pins 2 and 3, turning on power to the door timer 42 across its pins 8 and 1, and consequently pins 7 and 2. At this point in the cycle the door 60 is completely closed. The door timer then actuates the door motor through pins 3 and 6; after the motor "times out" to its set time, the door timer then actuates pins 4 and 5 through internal switches, thus actuating the hay advance timer 44 (pins 1 and 8). The hay advance timer thus actuates pins 4 and 5 internally, thereby operating switches 20 and 22, then stops at its set time. After a delay, timer 42 internally activates pins 3 and 6 and runs the door motor in reverse, also operating the cutting blade motor 58. This timer then times out at its preselected interval and shuts off, thus readying the system for a repeat operation. When the flake of hay 48 is severed from the bale by the cutting blade, the flake falls forwardly and downwardly to the ground or to a chute (not shown); a forward portion of the chamber in advance of the cutting blade does not have a bottom wall, so the severed portion of the bale is free to fall toward the ground. As it falls, the bale will push the hinged door 16 outwardly (as shown in phantom in FIG. 2), permitting its free fall. The hinged door precludes any animals in the area from being injured during the operation of the cutting device.

It will of course be apparent to those skilled in the art that many alternatives and variations to the embodiment described herein may be made within the spirit and scope of the invention. The specific components, timers, and sequences are of course subject to variation, the essence of the invention being the ability to sever predetermined portions of a hay bale automatically at predetermined times. It is contemplated that instead of moving the bale toward the cutting blade, the blade can be mounted so as to travel lengthwise along the bale a preselected distance prior to cutting.

As discussed, many variations are possible within the spirit and scope of the invention. Accordingly, the preceding description of a preferred embodiment should not be considered as limiting, and rather the invention should be defined only by the following claims.

I claim:

1. An automatic animal feeding apparatus comprising a housing,
   a chamber within the housing adapted to receive a hay bale,
   cutting means mounted at an end portion of the chamber for severing a portion of the hay bale, said cutting means being movable along a plane transverse to the bale between a first position on one side of the bale to a second position adjacent another side of the bale,
   advancement means for moving the bale within the chamber toward the cutting means,
   actuating means for sequentially activating the advancement means and the cutting means, drive means for operably moving the cutting means transverse to the chamber, and a power source for providing electrical power to the advancement means and the cutting means.

2. The automatic animal feeding apparatus of claim 1 wherein the housing also includes door means movable between a fully open and a fully closed position, said door means forming a chamber wall when in the fully closed position.

3. The automatic animal feeding apparatus of claim 2 also comprising door drive means for opening and closing the door, and door timer means for activating the door drive means at a preselected time.

4. The automatic animal feeding apparatus of claim 3 also including first timer means for activating the advancement means, door timer means for activating the door drive means, and electrical circuit means for connecting the advancement means, the door drive means, and the power source.

5. The automatic animal feeding apparatus of claim 1 wherein the advancement means comprises cable means adapted to extend around a portion of the bale of hay, cable retrieving means for adjusting the length of the cable means, and drive means for operating the cable retrieving means.

6. The automatic animal feeding apparatus of claim 5 wherein the cable means comprises a first cable portion, a second cable portion, and fastening means for releasably connecting said first and second cable portions.

7. The automatic animal feeding apparatus of claim 5 in which the cable retrieving means comprises first winch means, second winch means, and winch drive means for driving the first and second winch means.

8. The automatic animal feeding apparatus of claim 1 wherein the cutting means comprises a blade movably mounted to traverse a cross section of the hay bale.

9. The automatic animal feeding apparatus of claim 8 also including blade drive means for reciprocally moving the blade as the blade traverses the cross section of the hay bale.

10. The automatic animal feeding apparatus of claim 8 in which the cutting means is mounted on a lower portion of the door means.

11. The automatic animal feeding apparatus of claim 10 in which the door means includes a sleeve fixedly attached thereto, and the cutting means comprises an arm operably connected to the blade and the blade drive means, said arm being slideably mounted in the sleeve.

12. An automatic animal feeding apparatus comprises
a housing,
a chamber within the housing adapted to receive a bale of hay,
advancement means for moving the bale of hay longitudinally in the chamber, said advancement means including a first cable portion, a second cable portion, fastening means for releasably connecting said first and second cable portions, and first and second winch means for retrieving said first and second cable means, respectively, and winch drive means for driving the first and second winch means,
door means mounted in the housing and being movable transversely to the chamber between a fully open and a fully closed position,
door drive means for opening and closing the door means,
cutting means mounted on a lower portion of the door means, said cutting means including a blade, blade drive means for reciprocally moving the blade in a substantially horizontal plane, a sleeve fixedly attached to the door means, an arm slideably mounted in the sleeve, said arm being operably connected to the blade and the blade drive means,
first timer means for activating the advancement means,
door timer means for activating the door drive means,
electrical circuit means for connecting the advancement means, winch drive means, door drive means, blade drive means, and first and second timers,
clock means for actuating the electrical circuit means at a preselected time, and
a source of DC power.

* * * * *